(12) United States Patent
Won

(10) Patent No.: US 7,889,997 B2
(45) Date of Patent: Feb. 15, 2011

(54) PORTABLE WIRELESS TERMINAL FOR VISIBLE LIGHT COMMUNICATION

(75) Inventor: Eun-Tae Won, Seoul (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 703 days.

(21) Appl. No.: 11/893,193

(22) Filed: Aug. 15, 2007

(65) Prior Publication Data

US 2008/0107419 A1    May 8, 2008

(30) Foreign Application Priority Data

Nov. 7, 2006    (KR) ............... 10-2006-0109397

(51) Int. Cl.
   *H04B 10/10* (2006.01)
   *H04B 10/24* (2006.01)

(52) U.S. Cl. ............... 398/169; 398/170; 398/172

(58) Field of Classification Search ......... 398/169–170, 398/172
   See application file for complete search history.

(56) References Cited

U.S. PATENT DOCUMENTS

| | | | |
|---|---|---|---|
| 3,676,003 A * | 7/1972 | Naiman et al. | 356/5.06 |
| 4,099,050 A * | 7/1978 | Sauermann | 398/170 |
| 4,777,660 A * | 10/1988 | Gould et al. | 398/170 |
| 4,866,781 A * | 9/1989 | Borken et al. | 382/103 |
| 6,539,138 B2 | 3/2003 | Holmes | 385/16 |
| 6,597,476 B1 | 7/2003 | Okorogu | 359/15 |
| 6,967,754 B2 | 11/2005 | Bratt et al. | 359/15 |
| 7,308,207 B2 * | 12/2007 | Chen | 398/170 |
| 2008/0247764 A1 * | 10/2008 | Lewin et al. | 398/154 |
| 2008/0310024 A1 * | 12/2008 | Sato et al. | 359/570 |
| 2009/0103925 A1 * | 4/2009 | Alpert | 398/130 |
| 2009/0116850 A1 * | 5/2009 | Maryfield | 398/202 |

* cited by examiner

*Primary Examiner*—Leslie Pascal
(74) *Attorney, Agent, or Firm*—Cha & Reiter, LLC

(57) ABSTRACT

A portable wireless terminal for performing visible light communication with other devices through free space includes an optical detector for generating an electrical signal after photoelectrically converting some of optical signal input from free space and outputting the electrical signal; a reflector for retro-reflecting the others of the optical signal incident on the concave grooves, the reflector having a reflection surface on which at least one concave groove is formed; and a modulator for outputting the retro-reflected optical signal after data modulation.

9 Claims, 4 Drawing Sheets

PORTABLE WIRELESS TERMINAL FOR VISIBLE LIGHT COMMUNICATION

CLAIM OF PRIORITY

This application claims the benefit under 35 U.S.C. §119(a) of an application entitled "Portable Wireless Terminal for Visible Light Communication," filed in the Korean Intellectual Property Office on Nov. 7, 2006 and assigned Serial No. 2006-109397, the contents of which are hereby incorporated by reference.

BACKGROUND OF THE INVENTION

1. Field of the Invention

The present invention relates to a portable wireless terminal. More particularly, the present invention relates to a portable wireless terminal for performing visible light communication with other devices through free space.

2. Description of the Related Art

Visible light communication is based on the fact that the wireless terminal of a transmission end transmits data-modulated visible light signals to the wireless terminal of a reception end, then the wireless reception terminal demodulates data signals from the received visible light signals. In the visible light communication, the wireless transmission terminal transmits visible light signals to the wireless reception terminal. However, under an interactive communication environment, each of the transmission side and the reception terminal either transmits or receives visible light signals without any distinction between the transmitting and receiving ends. To perform visible light communication, the wireless terminal of the transmitting side must inevitably have a light source in order to generate data-modulated visible light signals. Therefore, each wireless terminal must have a light source in order to perform interactive communication through a visible light.

FIG. 1 is a block diagram illustrating a conventional visible light communication system. The visible light communication system 100 includes first and second portable wireless terminals 110 and 120 for transmitting/receiving optical signals through free space, and the respective potable wireless terminals 110 and 120 include Light Sources (LS) 112 and 122 for generating data-modulated optical signals (i.e. electrophotonic conversion of data signal into optical signal) and outputting the generated optical signals to free space, and Optical Detectors (OD) 114 and 124 for photoelectrically converting optical signals input from free space into electrical signals.

FIG. 1 illustrates a procedure of transmitting optical signals from the first portable wireless terminal 110 to the second portable wireless terminal 120. The data-modulated optical signals output from the light source 112 of the first portable wireless terminal 110 are input into the optical detector 124 of the second portable wireless terminal 120 through free space, and the optical detector 124 photoelectrically converts the optical signals into electrical signals.

However, in a visible light communication system as described above, one wireless terminal may be under conditions (e.g. power, a light source, etc.) sufficient for transmission of visible light signals whereas the other wireless terminal may be under insufficient conditions thereof. If so, it is difficult to establish interactive communication. In order to generate visible light signals, a lot of power is required. Therefore, these conditions may emerge as a big problem in terms of the portable wireless terminal featuring a limited available time.

SUMMARY OF THE INVENTION

Accordingly, the present invention has been made to solve the above-mentioned problems occurring in the prior art and provides additional advantages, by providing a portable wireless terminal for performing visible light communication with other devices, even without a light source.

In accordance with an aspect of the present invention, a portable wireless terminal for performing visible light communication with other devices through free space including: an optical detector for generating an electrical signal after photoelectrically converting some of optical signal input from free space and outputting the electrical signal; a reflector for retro-reflecting the others of the optical signal incident on the concave grooves, the reflector having a reflection surface on which at least one concave groove is formed; and a modulator for outputting the retro-reflected optical signal after data modulation.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE INVENTION

Hereinafter, exemplary embodiments of the present invention will be described with reference to the accompanying drawings. For the purposes of clarity and simplicity, a detailed description of known functions and configurations incorporated herein will be omitted as it may make the subject matter of the present invention rather unclear.

Figure 1:
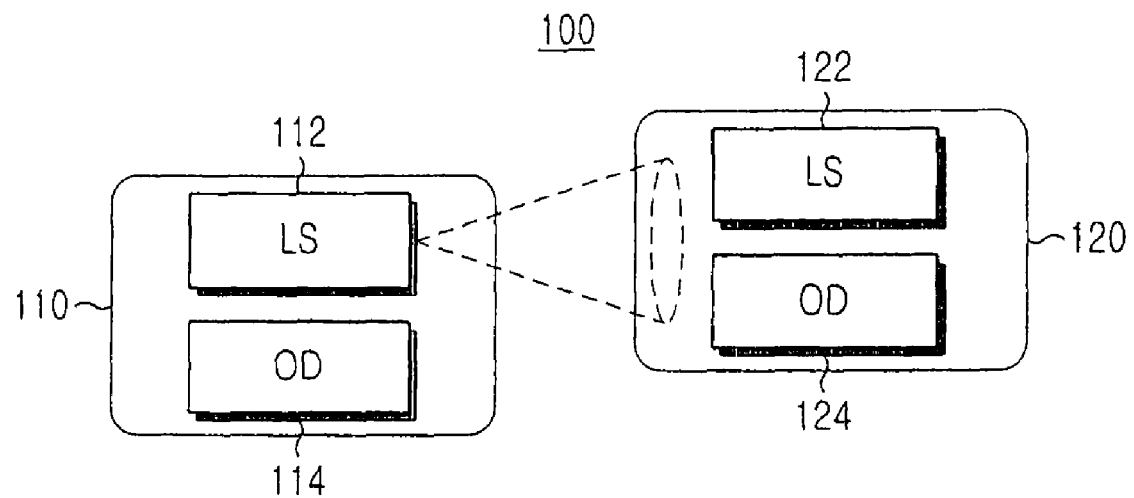
FIG. 1 is a block diagram illustrating a conventional visible light communication system.
Figure 2:
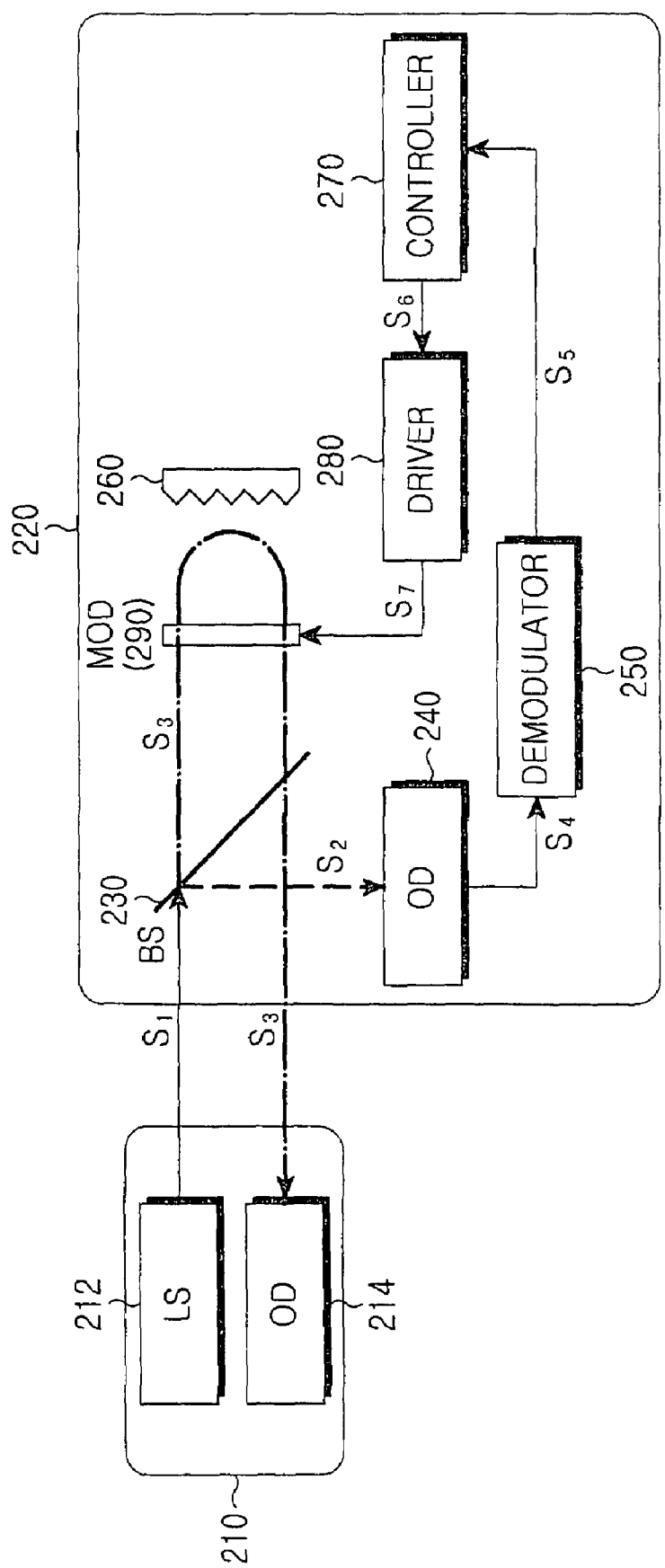
FIG. 2 is a block diagram illustrating a visible light communication system including a portable wireless terminal according to a first embodiment of the present invention.
Figure 3:
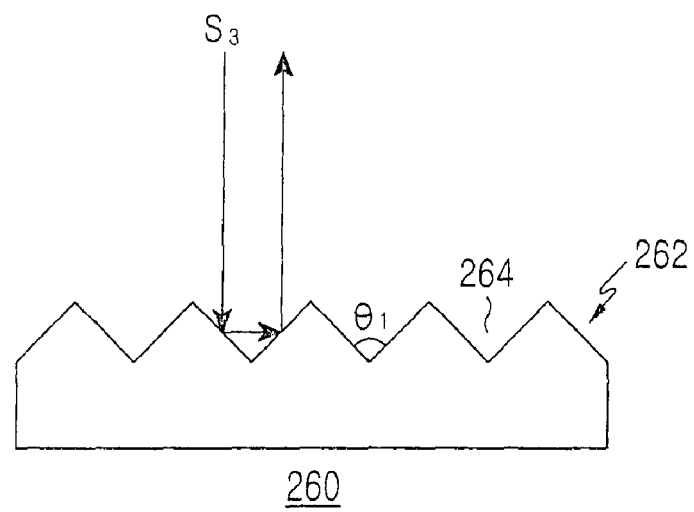
FIG. 3 is a sectional view illustrating of a reflector shown in FIG. 2.

FIG. 2 is a block diagram illustrating a visible light communication system including a portable wireless terminal according to a first embodiment of the present invention, and FIG. 3 is a sectional view illustrating of a reflector shown in FIG. 2.

Referring to FIG. 2, the visible light communication system 200 includes a fixed wireless terminal 210 and a portable wireless terminal 220 for individually transmitting/receiving optical signals through free space.

The fixed wireless terminal 210 includes a light source 212 for generating a data-modulated optical signal $S_1$ and outputting the generated optical signal $S_1$ to the portable wireless terminal 220, and the optical detector 214 for photoelectrically converting an optical signal $S_3$ input from the portable wireless terminal 220 into an electrical signal. The fixed wireless terminal 210 demodulates a data signal from the electrical signal output from the optical detector 214.

The portable wireless terminal 220 includes a Beam Splitter (BS) 230, an Optical Detector (OD) 240, a demodulator 250, a reflector 260, a controller 270, a driver 280, and a modulator (MOD) 290.

The beam splitter 230 partially transmits and reflects (i.e. divides the power of the optical signal $S_1$ into equal parts) the optical signal $S_1$ input from the fixed wireless terminal 210, thereby generating first and second division optical signals $S_2$ and $S_3$, outputting the first division optical signal $S_2$ to the optical detector 240, and outputting the second division optical signal $S_3$ to the modulator 290. A general half mirror may be used as the beam splitter 230.

The optical detector 240 photoelectrically converts the first division optical signal $S_2$ input from the beam splitter 230 into an electrical signal $S_4$ and outputting the converted signal. The electrical signal $S_4$ has power and/or a waveform suitable for visible light communication. A general photodiode (PD) may be used as the optical detector 240.

The demodulator 250 demodulates a data signal $S_5$ from the electrical signal $S_4$ input from the optical detector 240 and outputs the demodulated data signal $S_5$ to the controller 270. The data signal $S_5$ has power and/or a waveform (e.g. a binary signal) suitable for data processing of the controller 270. For example, the demodulator 250 can eliminate a bias voltage of the electrical signal $S_4$.

The reflector 260 reflects the second division optical signal $S_3$ input from the beam splitter 230 back to a side of the fixed wireless terminal 210. The reflector 260 is shaped like a rectangular plate, and has a plurality of concave grooves 264 (i.e. V-groove; hereinafter, it will be described based on the V-groove), which are consecutively formed in a transverse direction on a reflection surface 262 facing the fixed wireless terminal 210. Preferably, an angle $\theta_1$ of the V-groove is angulated by 90°. For example, the reflector 260 can be implemented by forming a plurality of V-grooves 264 consecutively formed in a transverse direction on one surface of a glass flat board by using a general V-groove cutter, and then applying a mirror coating to the plurality of V-grooves.

The controller 270 receives the data signal $S_5$ from the demodulator 250 and outputs the data signal $S_6$, which is to be transmitted to the fixed wireless terminal 210, to the driver 280.

The driver 280 modulates the data signal $S_6$ input from the controller 270 into an electrical signal $S_7$ having power and/or a waveform suitable for operation of the modulator 290, and outputs the modulated electrical signal $S_7$ to the modulator 290. For example, the driver 280 may output the data signal $S_6$ after amplifying the data signal $S_6$.

The modulator 290 is interposed between the beam splitter 230 and the reflector 260, modulates the optical signal $S_3$, which is to be reflected back to the fixed wireless terminal 210, depending on the electrical signal $S_7$ input from the driver 280, and then outputs the modulated signal. The optical signal $S_3$ output from the modulator 290 is output to the fixed wireless terminal 210 through the beam splitter 230. A general optical attenuator may be used as the modulator 290, and the general optical attenuator has a characteristic in that the transmission rate is changed according to a voltage of an applied electrical signal. For example, the optical attenuator has a characteristic in that it may have a relatively high transmission rate when an electrical signal corresponding to 1 bit is input, and it may have a relatively low transmission rate when an electrical signal corresponding to 0 bit is input. For example, in a case of using an optical attenuator as the modulator 290, the modulator 290 may intensity-modulate the optical signal reflected back to the fixed wireless terminal 210 depending on the electrical signal $S_7$ input from the driver 280 and may output the intensity-modulated signal. Although the optical signal $S_3$ reflected back to the fixed wireless terminal 210 is transmitted through the modulator 290 twice, the time taken for two-time transmission of the optical signal $S_3$ through the modulator 290 is much shorter than the delay time of 1 bit of the data signal $S_6$ or the electrical signal $S_7$. Therefore, it is possible to disregard the signal distortion caused by this delay.

Figure 4:
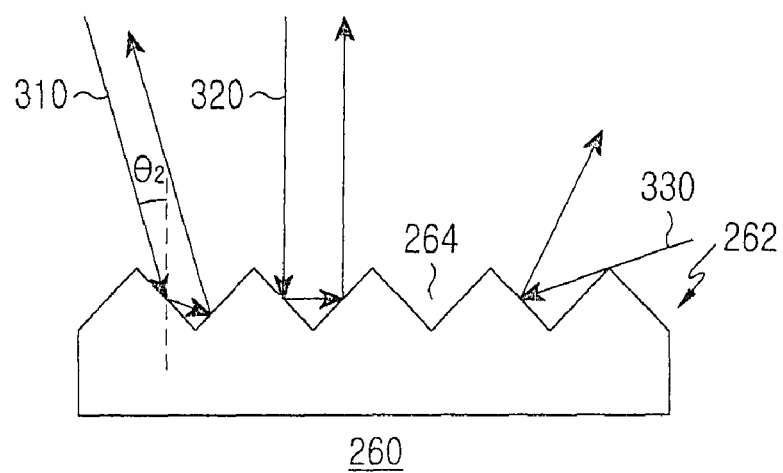
FIG. 4 is a sectional view illustrating a reflection characteristic of the reflector shown in FIG. 3.

FIG. 4 is a sectional view illustrating a reflection characteristic of the reflector shown in FIG. 3. As shown in FIG. 4, the reflector 260 reflects a first optical signal 310 and a second optical signal 320 incident within an allowed angle with respect to an axis, which extends in parallel with a symmetry line of the respective V-grooves 264, back in a direction opposite to the incident direction, and prevents a third optical signal 330 incident beyond the angle from being reflected back in a direction opposite to the incident direction.

The second embodiment of the present invention provides a reflector capable of significantly increasing an allowed angle of retro-reflection and the reflector may be replaced with the reflector 260 shown in FIG. 2.

Figure 5:
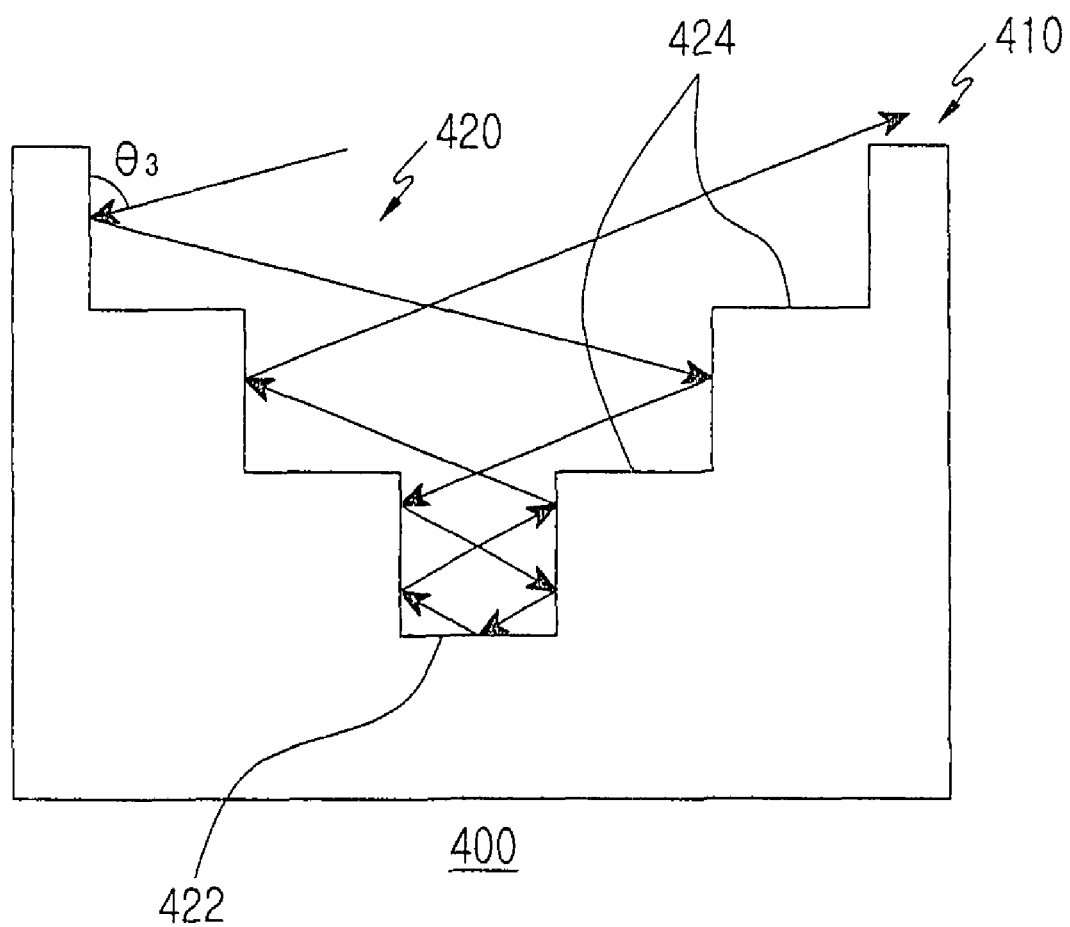
FIG. 5 is a sectional view illustrating a reflector according to a second embodiment of the present invention.

FIG. 5 is a sectional view illustrating a reflector according to a second embodiment of the present invention. As shown, the reflector 400 substantially has a shape of a rectangular plate, and has a reflection surface 410 for reflecting an incident optical signal back in a direction opposite to the incident direction. The reflection surface 410 has at least one concave groove 420 formed thereon and the concave groove 420 has a hierarchical structure including a plurality of stairs.

The concave groove 420 has a bottom surface 422 and a plurality of stairs 424, which are formed symmetrically with respect to the bottom surface 422 and are formed through repeated 90° upward bending from the bottom surface 422. For example, in order to implement the reflector 400, grooves having decreasing widths in a hierarchical structure including a plurality of stairs may be first formed by cutting one surface of a glass flat board by using a typical cutter capable of adjusting its cutting width, and a mirror coating may be then applied on the concave groove having the hierarchical structure. As shown in FIG. 5, the reflector 400 reflects an optical signal incident within an allowed angle $\theta_3$ with respect to an axis, which extends in parallel with a symmetry line of the concave groove 420, back in a direction opposite to the incident direction. Note that the allowed angle $\theta_3$ of the reflector 400 significantly increases as compared with that of the reflector 260 of the first embodiment.

As described above, the portable wireless terminal for visible light communication according to the present invention retro-reflects an optical signal input from other devices by using a reflector and outputs the retro-reflected optical signal after data modulation. Therefore, the present invention does not require a separate light source. Accordingly, a portable wireless terminal according to the present invention can operate even with low power and is especially suitable for visible light communication indoors.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A portable terminal for performing visible light communication with other devices through free space, comprising:
   a beam splitter for dividing an optical signal input through the free space into first and second optical signals;
   an optical detector for generating an electrical signal after photoelectrically converting the first optical signal and outputting the electrical signal;

a reflector for retro-reflecting the second optical signal, the reflector having a reflection surface on which at least one concave groove is formed;

a modulator for twice modulating the second optical signal including modulating the second optical signal from the beam splitter and modulating the reflected second optical signal;

a demodulator configured to demodulate a first data signal from the electrical signal input from the optical detector and outputting the demodulated signal;

a controller configured to receive the first data signal from the demodulator and output a second data signal to be transmitted to other devices; and a driver configured to modulate the second data signal input from the controller into an electrical signal suitable for operation of the modulator and outputting the modulated electrical signal to the modulator.

2. The portable terminal as claimed in claim 1, wherein the reflector has a plurality of concave grooves consecutively formed in a transverse direction.

3. The portable terminal as claimed in claim 2, wherein the concave groove has a hierarchical structure including a plurality of stairs.

4. The portable terminal as claimed in claim 3, wherein the concave groove comprises:
a bottom surface; and
a plurality of stairs formed symmetrically with respect to the bottom surface, and
wherein a mirror coating is applied to the concave groove.

5. The portable terminal as claimed in claim 2, wherein each concave groove is a V-groove.

6. The portable terminal as claimed in claim 1, wherein the reflector substantially has a shape of a rectangular plate.

7. The portable terminal as claimed in claim 1, wherein the modulator is an optical attenuator having a characteristic in that the transmission rate is changed according to the voltage of an applied electrical signal.

8. A communication system having at least one fixed terminal and the portable terminal claimed in claim 1.

9. The communication system of claim 8, wherein the fixed terminal further includes a light source for generating the optical signal output to the portable terminal; and
an optical detector for photoelectrically converting the reflected second optical signal input from the portable terminal into an electrical signal.

* * * * *